United States Patent
Rabi et al.

(10) Patent No.: US 11,687,358 B2
(45) Date of Patent: Jun. 27, 2023

(54) NETWORK FUNCTIONS VIRTUALIZATION PLATFORMS WITH FUNCTION CHAINING CAPABILITIES

(71) Applicant: Altera Corporation, San Jose, CA (US)

(72) Inventors: Abdel Hafiz Rabi, High Wycombe (GB); Allen Chen, Cupertino, CA (US); Mark Jonathan Lewis, Marlow Bottom (GB); Jiefan Zhang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 17/214,522

(22) Filed: Mar. 26, 2021

(65) Prior Publication Data

US 2021/0216354 A1 Jul. 15, 2021

Related U.S. Application Data

(63) Continuation of application No. 16/683,093, filed on Nov. 13, 2019, now Pat. No. 10,963,291, which is a
(Continued)

(51) Int. Cl.
*G06F 13/40* (2006.01)
*G06F 9/455* (2018.01)
*G06F 13/28* (2006.01)

(52) U.S. Cl.
CPC .......... *G06F 9/45558* (2013.01); *G06F 13/28* (2013.01); *G06F 13/4022* (2013.01);
(Continued)

(58) Field of Classification Search
None
See application file for complete search history.

(56) References Cited

U.S. PATENT DOCUMENTS

| 7,843,926 B1 | 11/2010 | Muller et al. |
| 9,152,564 B2 | 10/2015 | Mita et al. |

(Continued)

FOREIGN PATENT DOCUMENTS

| CN | 103988483 A | 8/2014 |
| CN | 104221005 A | 12/2014 |

OTHER PUBLICATIONS

Deploying Extremely Latency-Sensitive Application in WMware vSphere 5.5: VM Ware, Oct. 10, 2013, 17 pages.
(Continued)

*Primary Examiner* — Scott C Sun
(74) *Attorney, Agent, or Firm* — Fletcher Yoder, P.C.

(57) ABSTRACT

A virtualization platform for Network Functions Virtualization (NFV) is provided. The virtualization platform may include a host processor coupled to an acceleration coprocessor. The acceleration coprocessor may be a reconfigurable integrated circuit to help provide improved flexibility and agility for the NFV. The coprocessor may include multiple virtual function hardware acceleration modules each of which is configured to perform a respective accelerator function. A virtual machine running on the host processor may wish to perform multiple accelerator functions in succession at the coprocessor on a given data. In one suitable arrangement, intermediate data output by each of the accelerator functions may be fed back to the host processor. In another suitable arrangement, the successive function calls may be chained together so that only the final resulting data is fed back to the host processor.

20 Claims, 9 Drawing Sheets

Related U.S. Application Data continuation of application No. 14/698,636, filed on Apr. 28, 2015, now Pat. No. 10,489,178.

(52) U.S. Cl.
CPC .............. *G06F 2009/45595* (2013.01); *G06F 2213/0038* (2013.01); *G06F 2213/28* (2013.01)

(56) References Cited

U.S. PATENT DOCUMENTS

| | | |
|---|---|---|
| 9,483,291 B1 | 11/2016 | Chen et al. |
| 9,892,082 B2 * | 2/2018 | Pope ...................... G06Q 40/04 |
| 2005/0193015 A1 | 9/2005 | Logston et al. |
| 2005/0278502 A1 | 12/2005 | Hundley |
| 2013/0091330 A1 * | 4/2013 | Mital ................. H04L 49/9089 711/130 |
| 2014/0133352 A1 | 5/2014 | Chapman |
| 2014/0133497 A1 | 5/2014 | Chapman |
| 2014/0201374 A1 | 7/2014 | Ashwood-Smith et al. |
| 2014/0229945 A1 | 8/2014 | Barkai et al. |
| 2014/0241247 A1 | 8/2014 | Kempf et al. |
| 2015/0043383 A1 | 2/2015 | Farkas et al. |
| 2015/0169496 A1 | 6/2015 | Pope |

OTHER PUBLICATIONS

Network Functions Virtualisation (NVF) NVF Performance & Portability Best Practices, Network Functions Virtialisation (NVF) ETSi Industry Specification Group (IDG), Jun. 2014, 65 pages.

* cited by examiner

NETWORK FUNCTIONS VIRTUALIZATION PLATFORMS WITH FUNCTION CHAINING CAPABILITIES

CROSS-REFERENCE TO RELATED APPLICATIONS

This application is continuation of U.S. patent application Ser. No. 16/683,093, filed Nov. 13, 2019, entitled "NETWORK FUNCTIONS VIRTUALIZATION PLATFORMS WITH FUNCTION CHAINING CAPABILITIES," which is a continuation of U.S. patent application Ser. No. 14/698,636, filed Apr. 28, 2015, entitled "NETWORK FUNCTIONS VIRTUALIZATION PLATFORMS WITH FUNCTION CHAINING CAPABILITIES," now U.S. Pat. No. 10,489,178, both of which are incorporated by reference herein in their entireties and for all purposes.

BACKGROUND

The growth of the Internet has helped create a network of networks that link together billions of devices worldwide. Conventionally, the fastest and most reliable networks are built with custom application-specific integrated circuits (ASICs) and purpose-built hardware. As a result, large enterprise networks often resemble complex, monolithic systems. In such types of custom systems, adding features ad hoc and making changes to these systems while ensuring that the network does not experience any interruptions is very challenging.

Due to recent network focused advancements in commodity computing hardware, services that were previously only capable of being delivered by proprietary, application-specific hardware can now be provided using software running on commodity hardware by utilizing standard information technology (IT) virtualization techniques that run on high-volume server, switch, and storage hardware to virtualize network functions. By leveraging standard IT virtualization technology to consolidate different types of network equipment onto commercial "off-the-shelf" high volume servers, switches, and storage, network functions such as network address translation (NAT), firewalling, intrusion detection, domain name service (DNS), load balancing, and caching (just to name a few) can be decoupled from propriety hardware and can instead be run in software. This virtualization of network functions on commodity hardware is sometimes referred to as Network Functions Virtualization (NFV).

In an effort to develop a fully virtualized infrastructure, leading service providers have come together and created the European Telecommunications Standards Institute (ETSI) Industry Specification Group (ISG) for Network Functions Virtualization (NFV). This group has helped create the architecture and associated requirements for virtualizing various functions within telecommunications networks. Benefits of Network Functions Virtualization include reduced capital expenditure (i.e., by reducing the need to purchase purpose-built hardware), operating expenditure (i.e., by reducing space, power, and cooling requirements), reduced time-to-market (i.e., accelerated deployment), improved flexibility to address constantly changing demands, etc.

It is within this context that the embodiments described herein arise.

SUMMARY

A Network Functions Virtualization (NFV) platform is provided that includes a host processor coupled to a reconfigurable coprocessor serving as a hardware accelerator. The coprocessor may include virtual function hardware accelerators that serve to improve the performance for at least some virtual machine running on the host processor. In accordance with an embodiment, a plurality of virtual function hardware accelerator modules in the coprocessor may be configured to perform different functions.

For example, first accelerator module may be configured to perform a first function, a second accelerator module may be configured to perform a second function that is different than the first function, and a third accelerator module may be configured to perform a third function that is different than the first and second functions. In particular, the coprocessor may include data switching circuitry that receives data output from the first accelerator module and that routes the data directly back to the second accelerator module (while preventing that data from being output to the host processor). Similarly, the data switching circuitry may also receive data output from the second accelerator module and route that data directly back to the third accelerator module (while prevent that data from being output to the host processor).

The data that is being processed by the accelerator modules may be retrieved from an external memory device that is directly attached to the host processor using a direct memory access (DMA) engine within the coprocessor.

The data switching circuitry may be configured to performing function chaining according to a set of conditional chaining instructions without sending intermediate data back to the external memory device.

In accordance with another embodiment, the data switching circuitry may route intermediate data results back to the external memory device for temporary storage. In other words, intermediate data results may still be sent back to the host processor even if they will immediately be sent back to another accelerator module to perform a successive function call.

Further features of the present invention, its nature and various advantages will be more apparent from the accompanying drawings and the following detailed description.

DETAILED DESCRIPTION

Embodiments of the present invention relate to Network Functions Virtualization (NFV) and more particularly, to hardware acceleration for NFV. It will be recognized by one skilled in the art, that the present exemplary embodiments may be practiced without some or all of these specific details. In other instances, well-known operations have not been described in detail in order not to unnecessarily obscure the present embodiments.

Conventionally, complex networks are built using fragmented, non-commodity hardware. When expanding or upgrading the network, new application-specific hardware needs to be installed, which not only increases deployment costs for existing vendors but also presents a large barrier to entry for new vendors, limiting innovation and competition.

In an effort to accelerate the deployment of new network services to satisfy the ever-increasing consumer demand for improved network speed and reliability, vendors (e.g., telecommunications operators or service providers such AT&T, Verizon, British Telecom, etc.) have come together and created the European Telecommunications Standards Institute (ETSI) Industry Specification Group (ISG). The ETSI ISG has since introduced virtualization technologies that can be applied to networking technologies to create a more intelligent and more agile service infrastructure. This concept of running network functions such as those performed traditionally by application-specific routers, firewalls, load balancers, content delivery networks (CDN), broadband network gateways (BNG), network address translators (NAT), domain name systems (DNS), and other networking devices in software on commodity hardware is sometimes referred to as Network Functions Virtualization (NFV).

Figure 1:
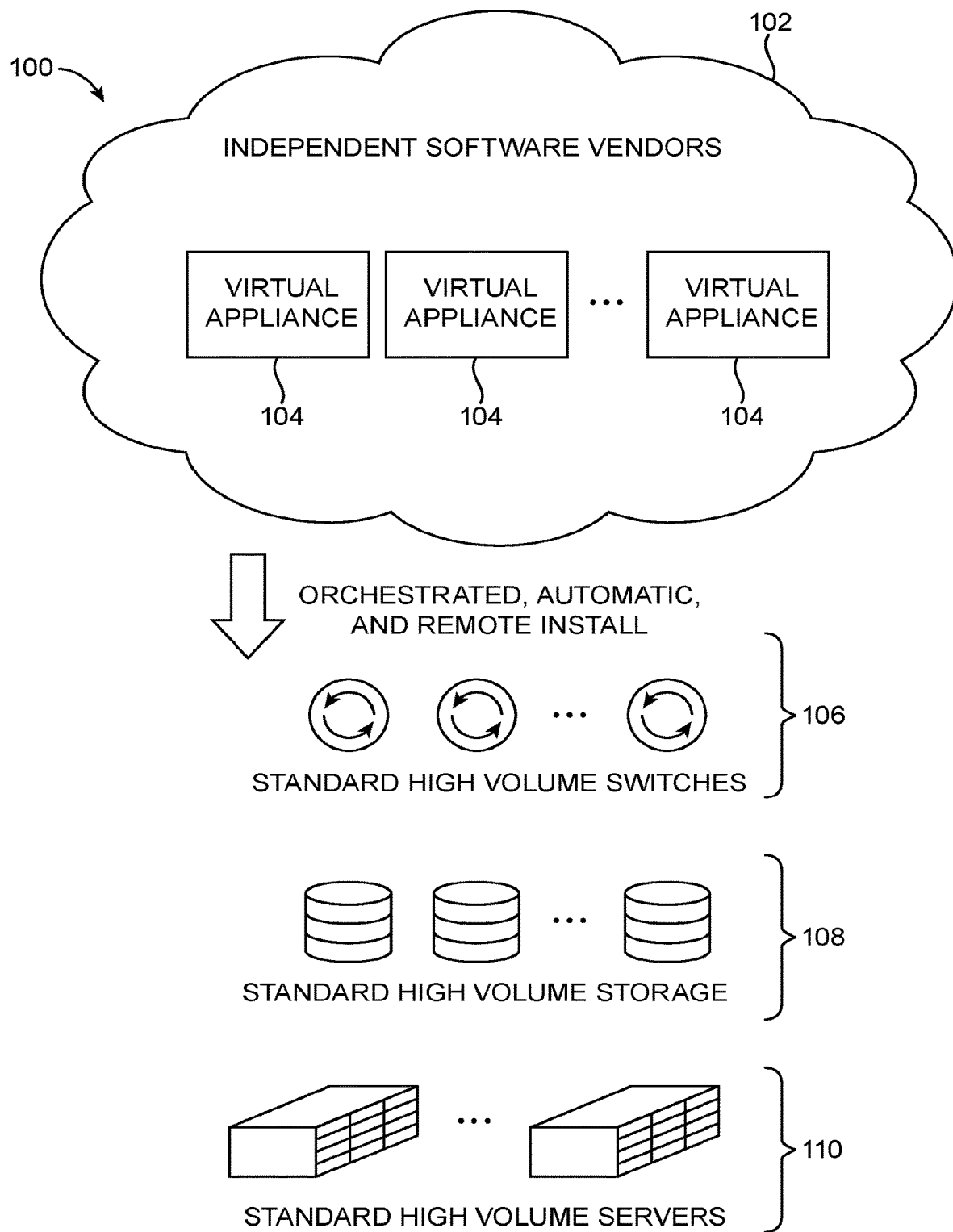
FIG. 1 is a diagram illustrating Network Functions Virtualization (NFV) in accordance with an embodiment.

The concept of Network Functions Virtualization is illustrated in FIG. 1. As shown in system 100 in FIG. 1, NFV allows services offered by a plurality of independent vendors to run separately on one or more virtual appliances 104 in a cloud 102. Effectively, the network services offered by the different software vendors can be implemented using virtual appliances 104 running on commercial off-the-shelf hardware, which includes but is not limited to standard high volume switches 106, standard high volume storage 108, and standard high volume servers 110 (e.g., the network functions can be orchestrated and remotely installed on commodity physical infrastructure rather than on more expensive purpose-built manufacturer-designed hardware).

Shifting different network components to commodity hardware helps to eliminate use of more costly, specialized hardware for different applications onsite and therefore helps to eliminate wasteful overprovisioning and can substantially reduce capital expenditure. Virtualization of the overall infrastructure also helps to streamline the operational processes and equipment that are used to manage the network. Since all the services are run on the same commodity hardware, datacenter operators no longer need to support multiple vendor and hardware models, thereby simplifying the base hardware support/management and providing a unified infrastructure that allows for automation and orchestration within and among different services and components.

For example, network administrators can coordinate (within the NFV framework) resource availability and automate the procedures necessary to make the services available, which reduces the need for human operators to manage the process and therefore reduces the potential for error. Moreover, NFV can also help reduce the time to deploy new networking services with minimal disruption to the network infrastructure to help seize new market opportunities and to improve return on investments (ROI) on new services while providing enhanced agility and flexibility by allowing the services to be quickly scaled up or down in software to address customer demands. If desired, NFV may be implemented in conjunction with the Software Defined Networking (SDN) approach that separates the network's control and forwarding planes to provide a more centralized view of the distributed network for a more efficient orchestration and automation of network services.

In general, there may be at least two different types of network function virtualization platforms including a native "bare metal" virtualization implementation and a "hosted" virtualization implementation. Bare metal virtualization involves installing a hypervisor (i.e., a computer software that creates and runs one or more virtual machines) as the first operating system on a host machine, whereas the hosted virtualization involves installing the hypervisor on top of an already live operating system (i.e., a host OS) running on the host machine. Bare metal virtualization offers direct access to the hardware resources on the host machine and is often used for enterprise solutions. On the other hand, hosted virtualization can only access the hardware through the host OS but allows running of multiple guest operating systems and is therefore often used for desktop solutions.

In general, the hosted implementation exhibits increased latency and a relatively wider statistical spread in the mean response time compared to the bare metal implementation. This increase in latency and variability for the hosted implementation may be due to contention created by the sharing of resources and also overhead associated with extra networking layers that are required for processing among multiple guest operating systems.

In an effort to provide improved performance predictability, datacenter operators (e.g., network orchestrators such as Microsoft, Google, and Amazon, just to name a few) provide resource availability description (RAD) for generic central processing units (e.g., CPUs within equipment 106, 108, and 110 of FIG. 1 that are being used to implement the virtual appliances). The resource availability description, however, only provides local information such as the CPU speed and the amount/type of local storage but does not specify how well the CPU interacts with external components.

Figure 2:
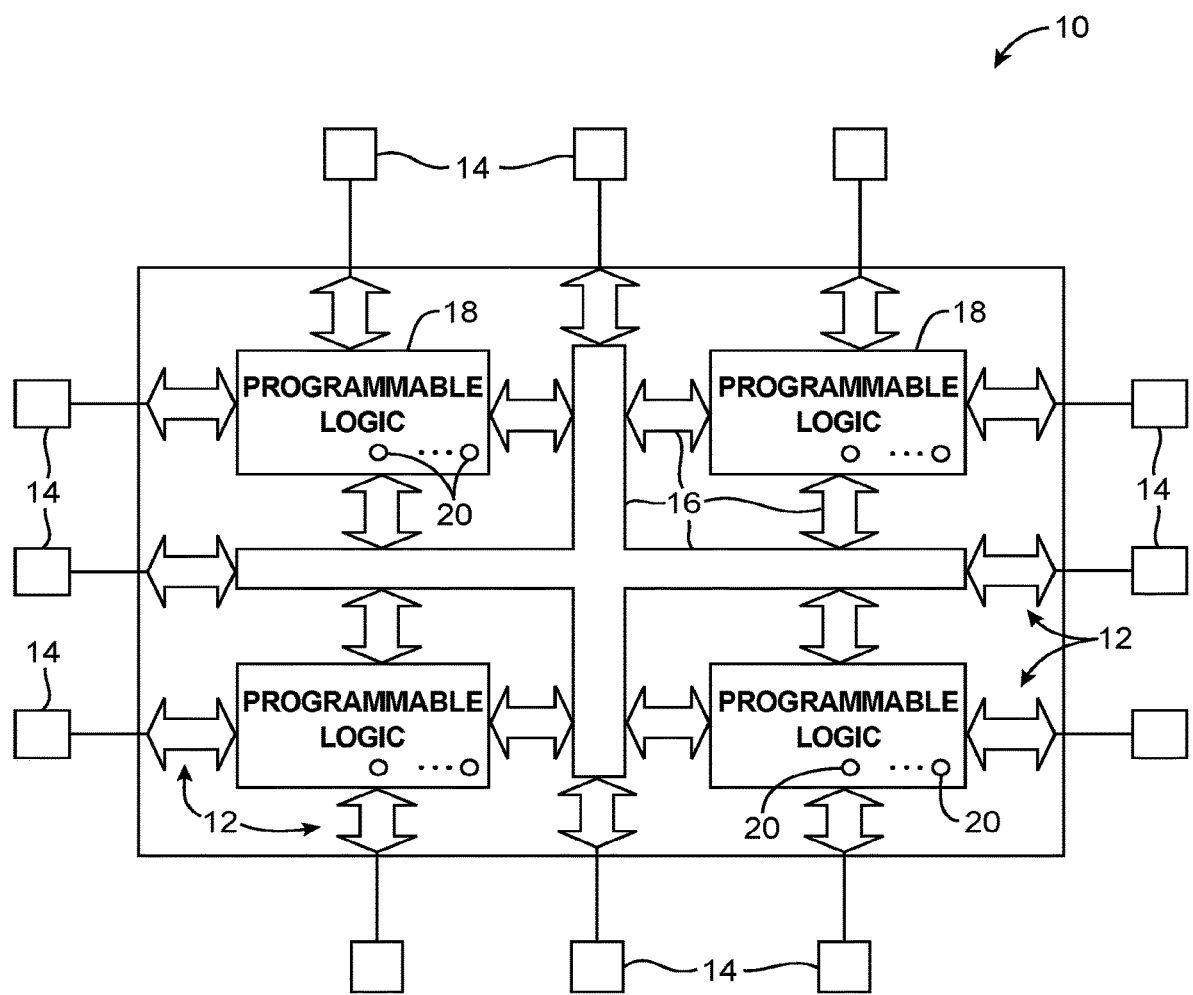
FIG. 2 is a diagram of an illustrative programmable integrated circuit in accordance with an embodiment.

To further enhance the achievable speed of the virtualized networks, a commodity CPU may be coupled to a hardware accelerator integrated circuit (sometimes referred to as a "coprocessor"). In accordance with an embodiment, the hardware accelerator device may be a programmable integrated circuit such as a programmable logic device (PLD). An illustrative integrated circuit of the type that may be used as a hardware accelerator is shown in FIG. 2. As shown in FIG. 2, integrated circuit 10 may contain memory elements 20. Memory elements 20 may be loaded with configuration data to configure programmable transistors such as pass transistors (sometimes referred to as pass gates or pass gate transistors) in programmable circuitry (programmable logic) 18.

Because memory elements 20 may be used in storing configuration data for programmable logic 18, memory elements 20 may sometimes be referred to as configuration random-access memory elements (CRAM). Integrated circuit 10 may be configured to implement custom logic functions by configuring programmable logic 18, so integrated circuit 10 may sometimes be referred to as a programmable integrated circuit.

As shown in FIG. 1, programmable integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects).

Programmable logic 18 may include combinational and sequential logic circuitry. Programmable logic 18 may be configured to perform a custom logic function. The programmable interconnects associated with interconnection resources 16 may be considered to form a part of programmable logic 18.

When memory elements 20 are loaded with configuration data, the memory elements each provide a corresponding static control output signal that controls the state of an associated logic component in programmable logic 18. The memory element output signals may, for example, be used to control the gates of metal-oxide-semiconductor (MOS) transistors such as n-channel metal-oxide-semiconductor (NMOS) pass transistors in programmable components such as multiplexers, logic gates such as AND gates, NAND gates, etc. P-channel transistors (e.g., a p-channel metal-oxide-semiconductor pass transistor) may also be controlled by output signals from memory elements 20, if desired. When a memory element output that is associated with an NMOS pass transistor is high, the pass transistor controlled by that memory element is turned on and passes logic signals from its input to its output. When the memory element output is low, an NMOS pass transistor is turned off and does not pass logic signals. P-channel metal-oxide-semiconductor (PMOS) pass transistors are turned on when the signal that is applied to its gate from the output of a memory element is low (e.g., 0 volts) and are turned off when the output of the memory element is high (i.e., the polarity for NMOS and PMOS control signals is reversed).

Configuration random-access memory elements 20 may be arranged in an array pattern. There may be, for example, millions of memory elements 20 on integrated circuit 10. During programming operations, the array of memory elements is provided with configuration data. Once loaded with configuration data, memory elements 20 may selectively control (e.g., turn on and off) portions of the circuitry in the programmable logic 18 and thereby customize the circuit functions of circuit 10.

The circuitry of programmable integrated circuit 10 may be organized using any suitable architecture. As an example, the circuitry of programmable integrated circuit 10 may be organized in a series of rows and columns of programmable logic blocks (regions) each of which contains multiple smaller logic regions. The logic resources of integrated circuit 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the circuitry of programmable integrated circuit 10 may be arranged in more levels or layers in which multiple large regions are interconnected to form still larger portions of logic. Still other device arrangements may use logic that is not arranged in rows and columns.

The example of FIG. 2 in which device 10 is described as a programmable integrated circuit is merely illustrative and does not serve to limit the scope of the present invention. The method and apparatus described herein may be incorporated into any suitable circuit. For example, the method and apparatus may also be incorporated into numerous types of devices such as microprocessors, digital signal processors, application specific standard products (ASSPs), application specific integrated circuits (ASICs), programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), just to name a few.

Figure 3:
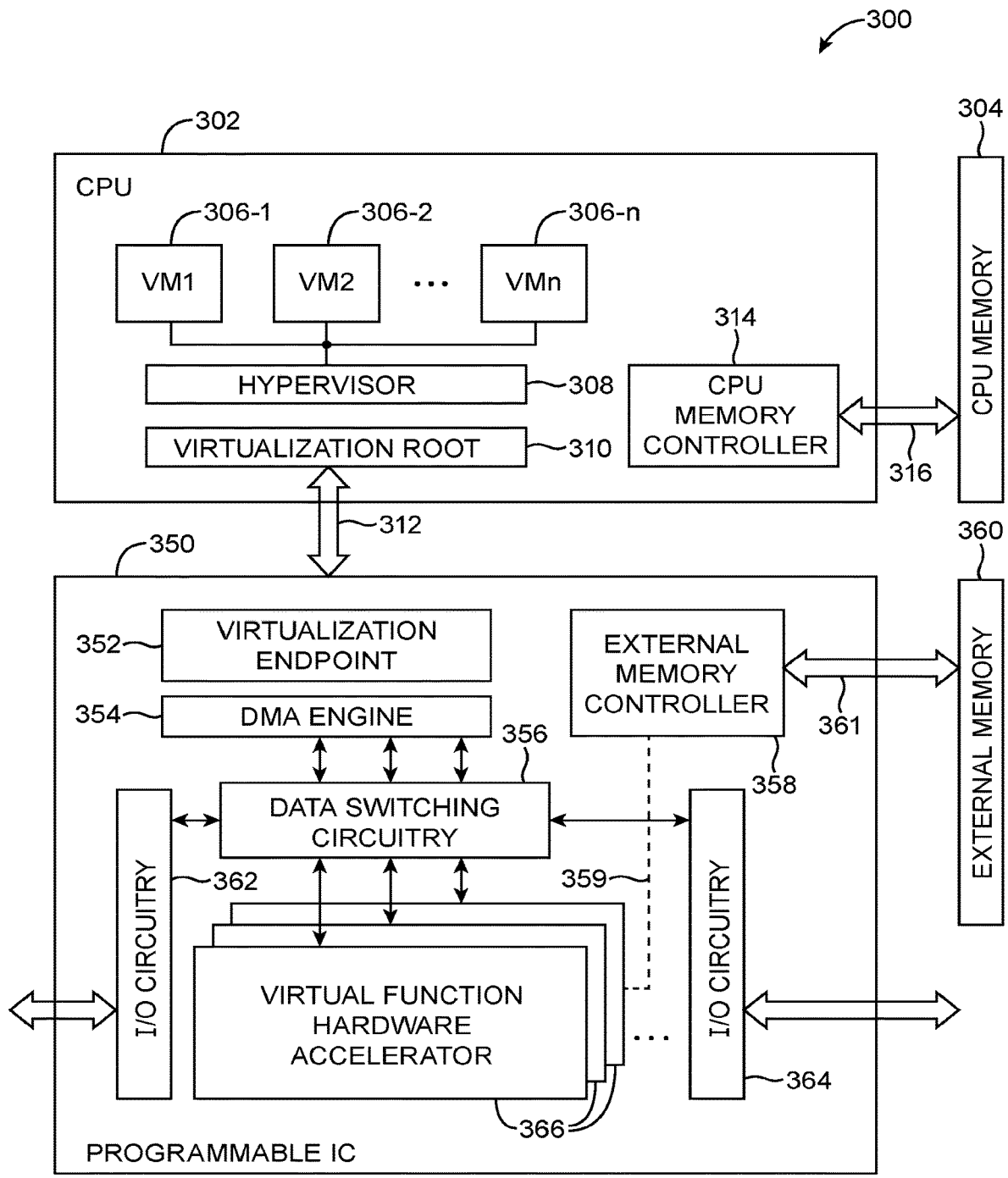
FIG. 3 is a diagram of an illustrative NFV platform that includes a central processing unit (CPU) coupled to a programmable hardware accelerator in accordance with an embodiment.

FIG. 3 is a diagram on an illustrative NFV platform 300 where a central processing unit (CPU) 302 is coupled to a hardware accelerator coprocessor such as a programmable integrated circuit 350. As shown in FIG. 3, software/firmware running on CPU 302 may include at least a hypervisor 308 and N associated virtual machines 306 (e.g., virtual machines 306-1, 306-2, ..., 306-n) and a virtualization root 310. CPU 302 on which hypervisor 308 is installed may be referred to as the "host machine."

As described above, hypervisor 308 may serve as a virtual machine manager (VMM) that runs one or more virtual machines 306 on a server. Each virtual machine 306 may be referred to as a "guest machine" and may each run a guest operating system (OS). The hypervisor presents the guest operating systems with a virtual operating platform and manages the execution of the guest operating systems while sharing virtualized hardware resources. Hypervisor 308 may run directly on the host's hardware (as a type-1 bare metal hypervisor) or may run on top of an existing host operating system (as a type-2 hosted hypervisor). If desired, additional paravirtualization drivers and tools (not shown) may be used to help each guest virtual machine communicate more efficiently with the underlying physical hardware. CPU 302 is also operable to communicate directly with an off-chip host memory 304. In yet other suitable embodiments, CPU 302 may be configured to communicate with network cards, disk drive controllers, graphics cards, sound cards, etc.

In the example of FIG. 3, root 310 may serve as a root complex that interfaces with a corresponding virtualization endpoint 352 in accelerator 350 using the Peripheral Component Interconnect Express (PCIe) standard. In a PCIe system, a root complex may refer to a device configured to connect a CPU to other PCIe endpoints and/or PCIe switches to which PCIe endpoints and other types of endpoints may be connected. A root complex is typically implemented with a full PCIe protocol stack that includes the transaction layer, data link layer, and physical layer. The use of a PCIe bus to connect CPU 302 and coprocessor 350 is merely illustrative. If desired, other types of input-output interface technologies can be used, including the Industry Standard Architecture (ISA) bus standard, the Micro Channel Architecture (MCA) bus standard, the Video Electronics Standards Association Local Bus (VESA) bus standard, the legacy PCI bus standard, the Accelerated Graphics Port (AGP) bus standard, the Universal Serial Bus (USB) standard, the Universal Asynchronous Receiver/Transmitter (UART) bus standard, etc.

Still referring to FIG. 3, software/firmware running on coprocessor 350 may also include at least a memory controller 358 (e.g., a memory controller for interfacing with external memory 360 that is directly coupled to coprocessor 350), a direct memory access (DMA) engine 354, data switching circuitry 356, input/output (IO) components 362 and 364, and one or more virtual function hardware accelerator modules (sometimes referred to as virtual function hardware accelerator slices) 366.

Each virtual function accelerator slice 366 may serve to provide hardware acceleration for one or more of the virtual machines 306 running on host processor 302. Components 362 and 364 may serve as ingress and/or egress interfaces for communicating with other IO devices that are coupled to coprocessor 350. Data switching circuitry 356 may be configured to route data among the accelerators 366, IO components 362 and 364 and DMA engine 354. Direct memory access engine 354 may be configured to route data from the host CPU memory 304 to coprocessor 350. Accelerators 366 may also be able to communicate directly with memory controller 358 via path 359.

NFV systems with hardware acceleration can sometimes process data using multiple virtual function accelerators immediately one after another. For example, a first hardware accelerator module in the coprocessor is configured to perform a first specialized function and a second hardware accelerator module in the coprocessor is configured to perform a second specialized function. In this example, consider a scenario in which the host processor needs data (e.g., data stored at the external host memory device) to be processed using the first specialized function at the first hardware accelerator and using the second specialized function at the second hardware accelerator in succession. In such scenarios, there needs to be a way for the processed data to be conveyed fluidly between the host processor and the coprocessor (e.g., between the off-chip host memory device and the virtual function hardware accelerator slices in the coprocessor).

Figure 4:
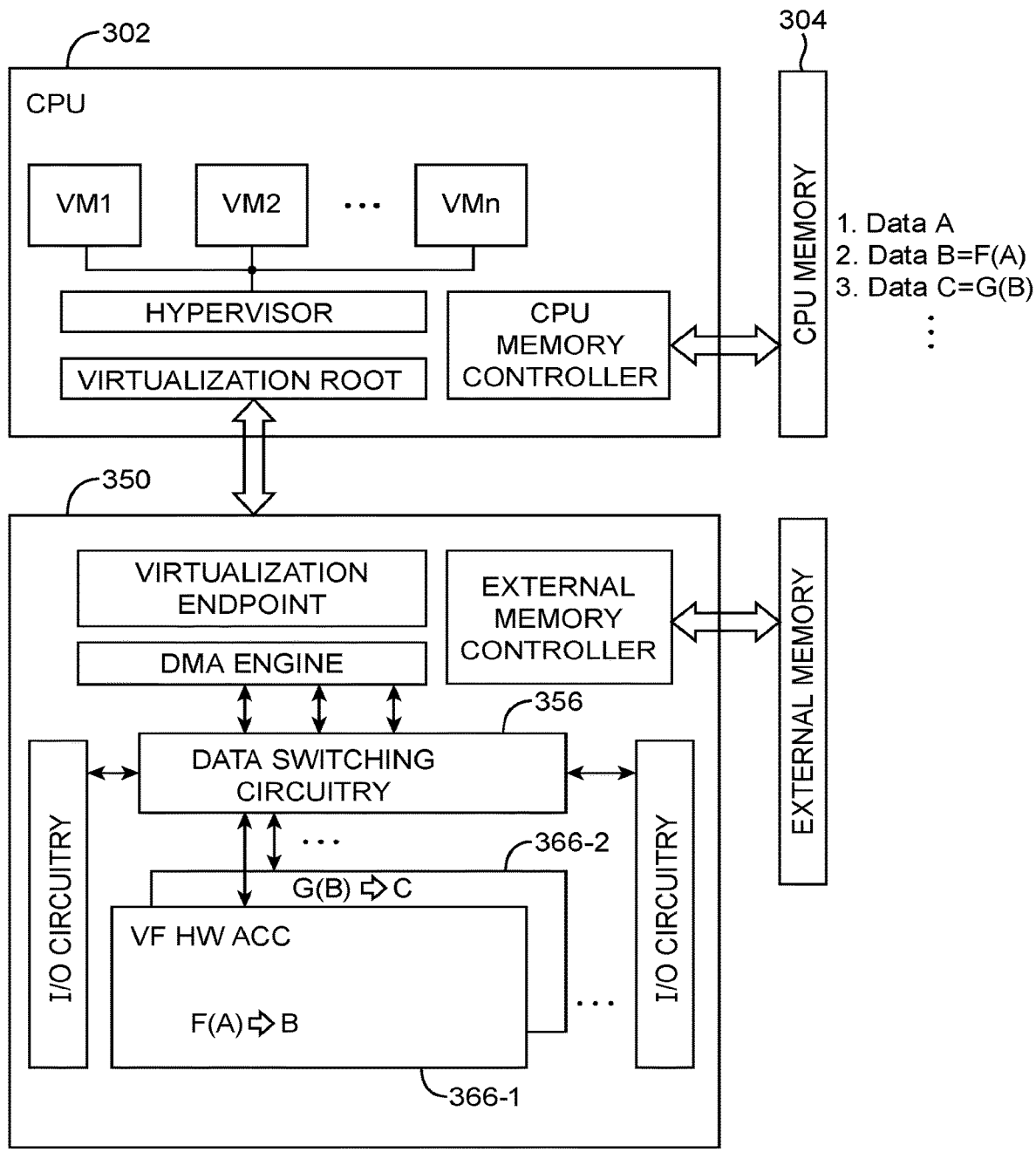
FIG. 4 is a diagram illustrating one suitable implementation in which each hardware accelerator function result is sent back to host memory in accordance with an embodiment.

In accordance with an embodiment, results after each function call to a corresponding accelerator slice in the coprocessor can be sent back to the host memory (see, e.g., FIG. 4). As shown in FIG. 4, a first virtual function hardware accelerator module 366-1 may be configured to perform a first function F(x), whereas a second virtual function hardware accelerator module 366-2 may be configured to perform a second function G(x).

Figure 5:
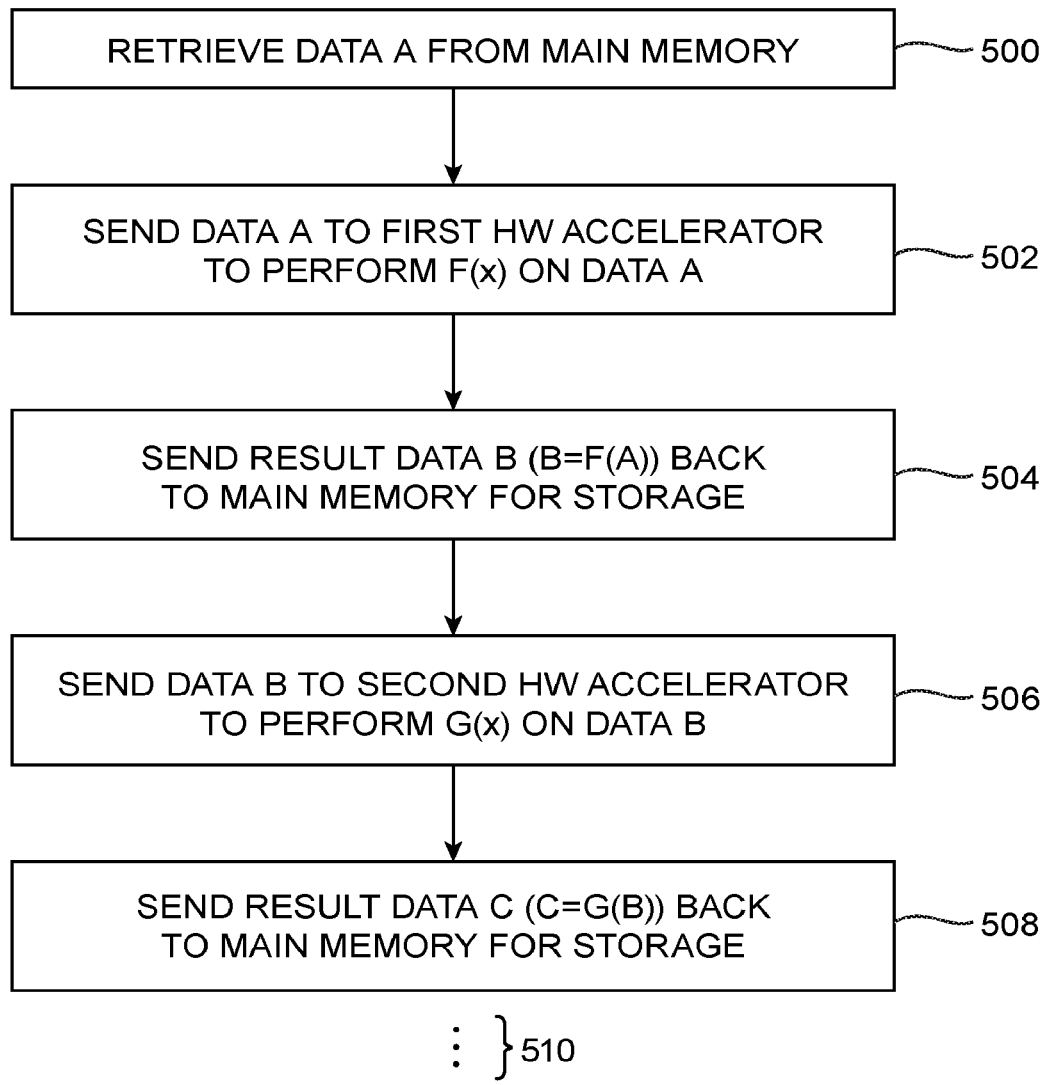
FIG. 5 is a flow chart of illustrative steps for operating the circuit implementation of FIG. 4 in accordance with an embodiment.

In the example of FIG. 4, a selected one of the virtual machines in the host processor may require data to be processed using a first function F(x) and then using a second function G(x). Illustrative steps involved in performing successive function calls using F(x) and then G(x) is shown in FIG. 5. For example, the selected virtual machine may direct the host memory controller to retrieve data A from the host memory 304 (step 500). In response, data A may be sent to accelerator module 366-1 via the DMA engine and the data switching circuitry 356. At step 502, the first accelerator module 366-1 may perform the first function on data A to generate a resulting data B. At step 504, data B (i.e., the result of function call F(A)) may then be conveyed back to the host memory 304 for temporary storage.

At this point, since the second function has still yet to be performed on the resulting data, data B is immediately retrieved and conveyed to the second accelerator module 366-2 via the DMA engine and the data switching circuitry (step 506). In response, the second accelerator module 366-2 may perform the second function on data B to generate a resulting data C. At step 508, data C (i.e., the result of function call G(B)) may then be fed back to the CPU memory 304 for storage. Operation may continue in this way by sending intermediate data back and forth between the relevant hardware accelerator modules and the host memory until all successive function calls are complete (as indicated by dots 510). In other words, any number of successive function calls may be performed using this iterative approach.

In accordance with another suitable embodiment, multiple function calls may be "chained" together to help reduce data congestion at the host memory interface while increasing overall performance. Chaining successive function calls ensures that intermediate data results stay within the coprocessor and is fed directly back to the next accelerator module without being fed back to the host processor. In other words, only the final result should be conveyed back to the host memory for storage. Chaining multiple "jobs" together in this way can help provide a more efficient communications scheme between the host processor and the coprocessor.

Figure 6:
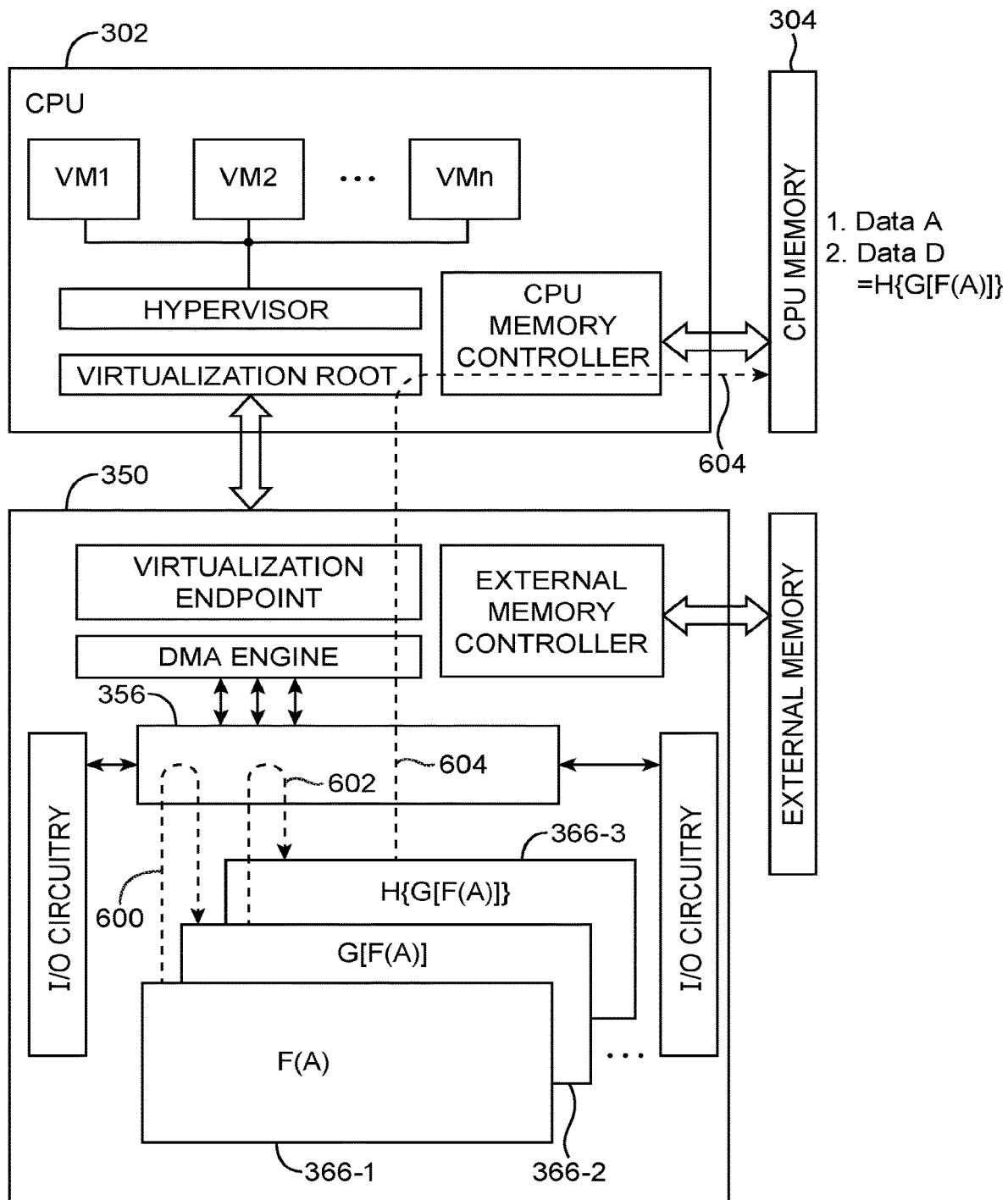
FIG. 6 is a diagraming illustrating another suitable implementation that provides hardware accelerator function chaining capabilities in accordance with an embodiment.

This chaining scheme is illustrated in FIG. 6. As shown in FIG. 6, a first virtual function hardware accelerator module 366-1 may be configured to perform a first function F(x); a second virtual function hardware accelerator module 366-2 may be configured to perform a second function G(x); and a third virtual function hardware accelerator module 366-3 may be configured to perform a third function H(x). In the example of FIG. 6, a selected one of the virtual machines in the host processor may require data to be processed using function F(x), function G(x), and function H(x), successively. For example, the selected virtual machine may direct the host memory controller to retrieve data A from the host memory 304. In response, data A may be sent to accelerator module 366-1 via the DMA engine and the data switching circuitry 356. The first accelerator module 366-1 may then perform the first function on data A to generate a resulting data B.

When the data switching circuitry 356 receives the intermediate resulting data B from the first accelerator module 366-1, the data switching circuitry may analyze the arriving data and recognize that this data needs to be sent back to another accelerator slice for further processing. In this particular example, data B may be sent directly back to the second VF hardware accelerator module 366-2 (as indicated by path 600) while preventing data B from being sent back to the host processor. The second accelerator module 366-2 may then perform the second function G(x) on data B to generate a resulting data C (i.e., the result of function call G(B), which is equal to G[F(A)]).

When the data switching circuitry 356 receives the intermediate resulting data C from the second accelerator module 366-2, the data switching circuitry may analyze the arriving data and recognize that this data needs to be sent back to yet another accelerator slice for further processing while preventing data C from being sent back to the host processor. In this particular example, data C may be sent directly back to the third VF hardware accelerator module 366-3 (as indicated by path 602). The third accelerator module 366-3 may then perform the third function H(x) on data C to generate a final data D (i.e., the result of function call H(C), which is equal to H{G[F(A)]}).

When data D arrives at the data switching circuitry, the data switching circuitry may recognize that this data need not be sent back to another accelerator module (i.e., no additional function call needs to be chained) and may proceed to send this final data back to the CPU memory 304 via the host processor (as indicated by path 604). The example of FIG. 6 in which three HW accelerator function calls have been chained together is merely illustrative and does not serve to limit the scope of the present invention. If desired, less than three or more than three accelerator functions can be chained in series in this way.

Figure 7:
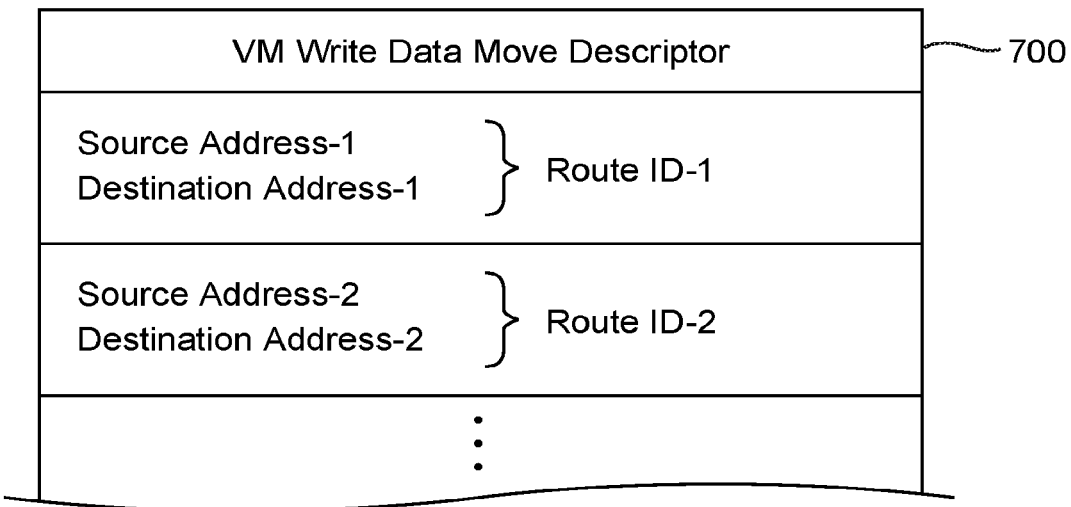
FIG. 7 is a diagram of an illustrative data type descriptor in accordance with an embodiment.

In accordance with another embodiment, data that is to be processed by the coprocessor may have an associated virtual machine write data move descriptor (see, e.g., FIG. 7). As shown in FIG. 7, data descriptor 700 may assign for data having a first source address and a first destination address a first route identifier (i.e., ID-1), for data having a second source address and a second destination address a second route identifier (i.e., ID-2), etc. The different route IDs may be used to identify which types of chaining instructions are to be executed for that particular data. For example, data assigned route ID-1 may have a first predetermined set of chaining instructions, whereas data assigned route ID-2 may have a second predetermined set of chaining instructions that is different than the first set of chaining instructions.

Figure 8:
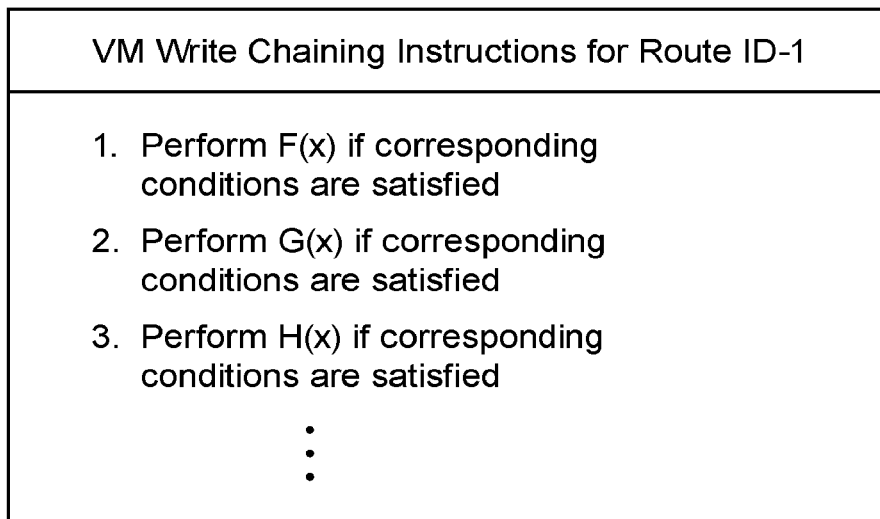
FIG. 8 is a diagram of illustrative chaining instructions associated with data of a particular route identifier in accordance with an embodiment.

FIG. 8 shows exemplary virtual machine write chaining instructions for data assigned route ID-1. As shown in FIG. 8, the chaining instructions may specify that a first function F(x) be performed if a first set of conditions is satisfies, that a second function G(x) be performed if a second set of conditions is met, that a third function H(x) be performed if a third set of conditions is fulfilled, etc. If desired, the chaining instructions may specify any number of virtual function hardware accelerator function calls to be chained in a conditional manner. When a particular set of conditions has not been met, one of the functions in the chaining instructions may be skipped. This type of conditional function routing may sometimes be referred to as "dynamic" accelerator function chaining.

The conditional checking for determining whether successive accelerator function calls should be chained may be based on (1) arguments associated with the data being processed, (2) additional sideband signals generated by the hardware accelerator, and/or other suitable dynamic data fields. The chaining control may be primarily handled by the data switching circuitry (as shown in the example of FIG. 6).

Figure 9:
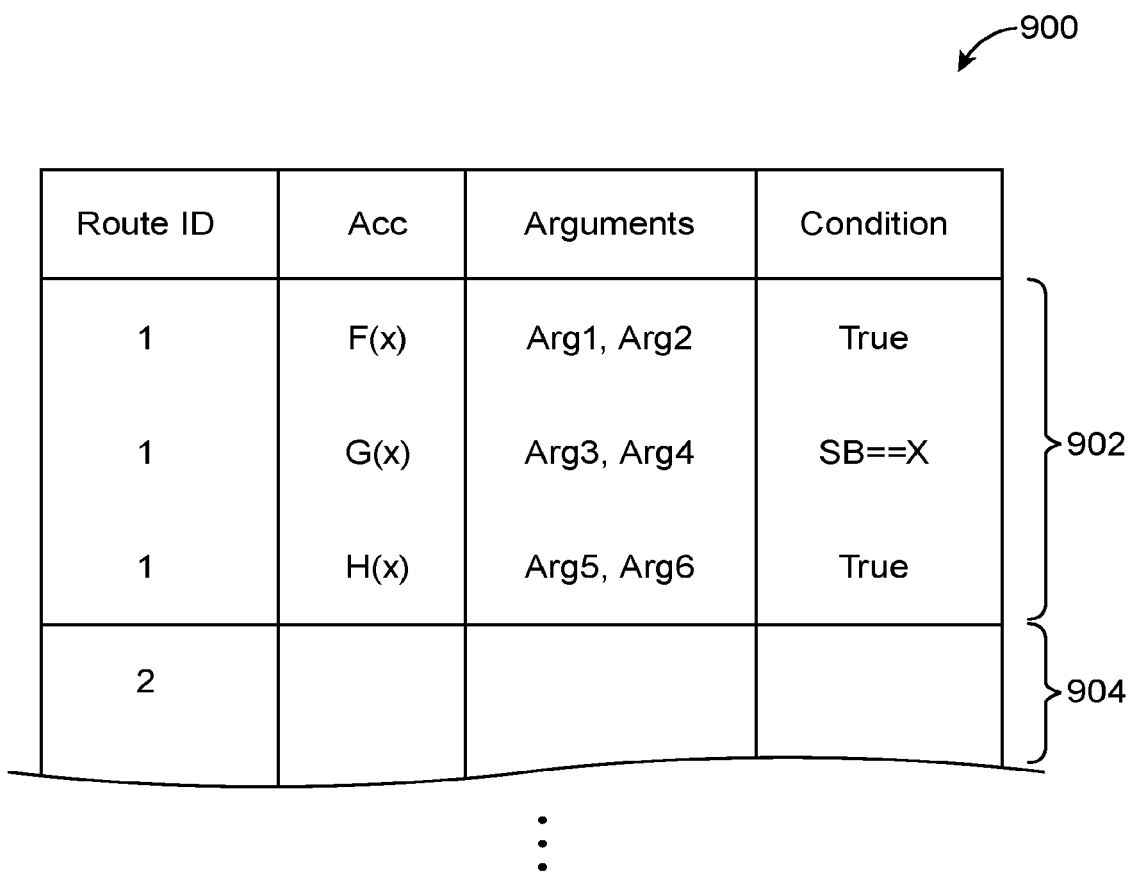
FIG. 9 is a diagram showing exemplary conditions that need to be satisfied in order to perform each of the chaining instructions of FIG. 8 in accordance with an embodiment.

FIG. 9 is a diagram showing exemplary conditions that need to be satisfied in order to perform each of the chaining instructions of FIG. 8 in accordance with an embodiment. As shown in table 900 of FIG. 9, the first accelerator function F(x) may be performed when the arguments associated with the data being processed is equal to Arg1 or Arg2. The second accelerator function G(x) may be performed when the sideband (SB) signals is equal to a particular value X. The third accelerator function H(x) may be performed when the arguments associated with the data being processed is equal to Arg5 or Arg6.

For example, consider a scenario in which a given virtual machine is configured to process a video data packet. The virtual machine may first need to determine whether the currently received piece of data is indeed in a video format. In this example, the virtual machine may send the received data to a first "video type detect" accelerator module with an associated argument. If the data type is indicative of an MP4 file type (e.g., if the argument Arg1 of FIG. 9 is equal to MP4), the first accelerator module may then generate a result with a sideband signal reflective of the MP4 file format.

This result may be directly chained to a second "video decompressing" accelerator module. The second accelerator module may recognize the MP4 sideband signal as a compressed file format and proceed to decompress the received data. The second accelerator module may then generate corresponding decompressed data.

The decompressed data may then be directly chained to a third "network packeting" accelerator module. The third accelerator module may be configured to add an Ethernet header, cyclic redundancy check (CRC) bits, and other networking control bits to the decompressed data. The argument to the third accelerator module may be the Ethernet type (e.g., argument Arg6 in FIG. 9 is equal to the Ethernet type). Once the third accelerator module has added the desired network control bits to the decompressed video data, the final output can then be sent back to the virtual machine.

This example in which three HW accelerator functions for processing video data is being chained is merely illustrative. Conditions 902 in table 900 may represent the criteria that need to be met when processing data having route ID-1. Other conditions (e.g., conditions 904) that are different than conditions 902 may be used when processing data with other route identifiers.

Figure 10:
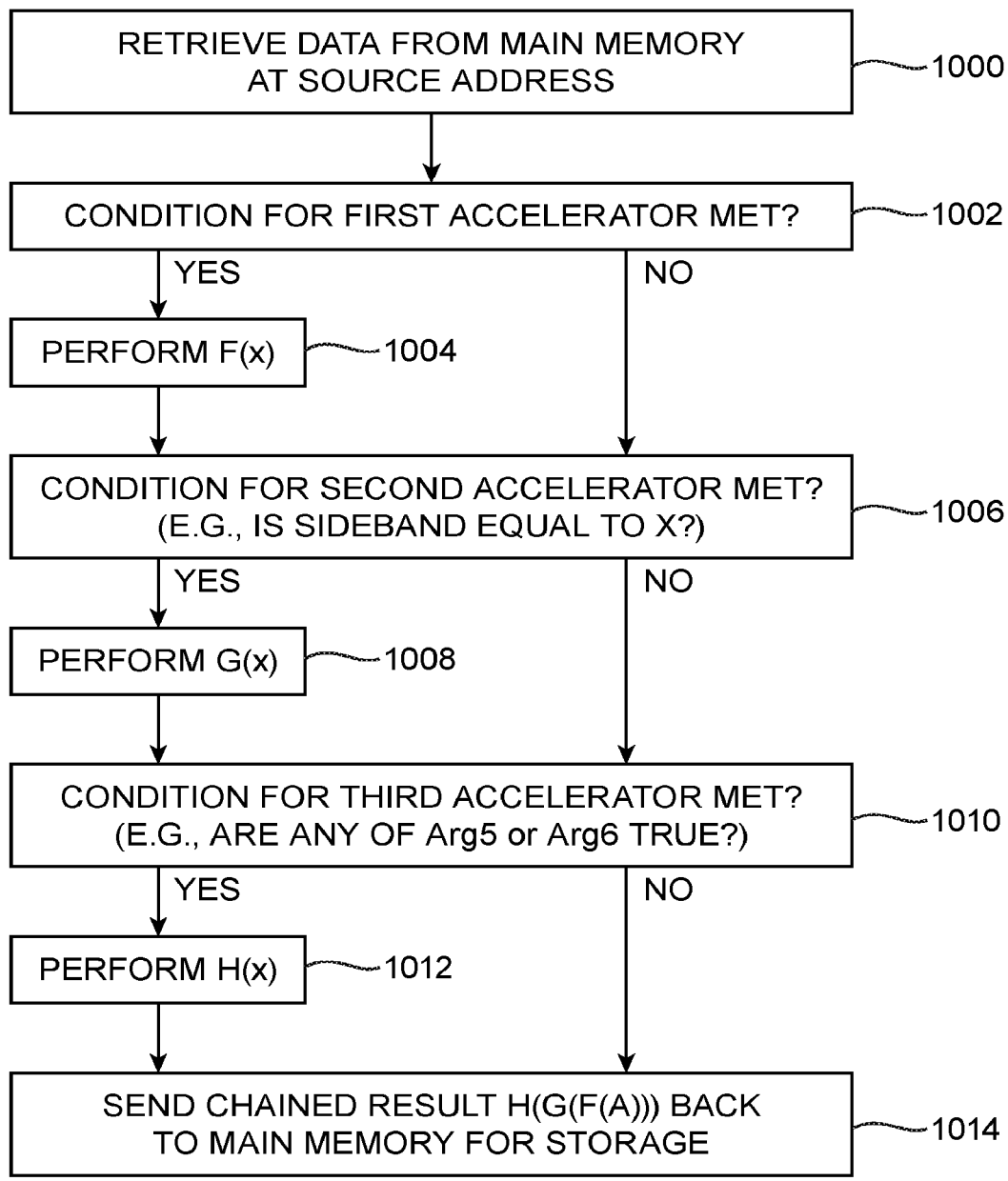
FIG. 10 is a flow chart of illustrative steps involved in operating an NFV platform in accordance with the embodiments of FIGS. 6-9.

FIG. 10 is a flow chart of illustrative steps involved in operating an NFV platform in accordance with the embodiments of FIGS. 6-9. At step 1000, data may be retrieved from the main CPU memory at the designated source address (e.g., the source addressed as specified in the data descriptor of FIG. 7).

If the conditions for the first accelerator module has been met, the first accelerator function F(x) may be performed (at step 1004). If the conditions for the first accelerator module is not satisfied (at step 1002), the first accelerator function F(x) may be skipped.

Whether or not the first accelerator function F(x) is performed, the data switching circuitry may determine based on the arguments or the sideband information whether the resulting intermediate data should be chained to a second accelerator module as designated by the chaining instructions of the type described in connection with FIG. 8. If the conditions for the second accelerator module has been met, the second accelerator function G(x) may be performed (at step 1008). If the conditions for the second accelerator module is not satisfied (at step 1006), the second accelerator function G(x) may be skipped.

Whether or not the second accelerator function G(x) is performed, the data switching circuitry may determine based on the arguments or the sideband information whether the resulting intermediate data should be chained to a third accelerator module as designated by the associated chaining instructions. If the conditions for the third accelerator module has been fulfilled, the third accelerator function H(x) may be performed (at step 1012). If the conditions for the third accelerator module is not satisfied (at step 1010), the third accelerator function H(x) may be skipped.

Once the last function in the chaining instructions is completed or skipped, the resulting final data may be conveyed back to the host memory for storage (at step 1014). The steps of FIG. 10 are merely illustrative and are not intended to limit the scope of the present invention. In general, this chaining approach may be extended to any number of VM hardware accelerator function calls in the coprocessor (whether or not any of the functions are being skipped when respective conditions are not satisfied) without sending any of the intermediate data back to the host processor. Operating an NFV platform in this way can help reduce data congestion with the CPU system memory while minimizing latency.

The embodiment of FIGS. 4-5 and the embodiments of FIGS. 6-10 may be used separately or together in one NFV platform. For example, some types of data need not have any chaining instructions, whereas other types of data might be provided with chaining instructions. As an example, data requiring only two successive function calls may not need to be chained, whereas data requiring three of more successive accelerator function calls may have specific chaining instructions/conditions. As another example, processing for a first data type (e.g., an email file) may not need to be chained, whereas processing for a second data type (e.g., voice data) may have specific chaining instructions/conditions. As yet another example, data with a relatively low priority levels may not need to be chained, whereas data with relatively higher priority levels may have specific chaining instructions/conditions.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An integrated circuit configurable to communicatively couple to a host processor associated with a network functions virtualization (NFV) platform, the integrated circuit comprising:
   a first virtual function hardware accelerator configurable to perform a first function;
   a second virtual function hardware accelerator configurable to perform a second function; and
   data switching circuitry configurable to:
      receive first data output from the host processor;
      send the first data to the first virtual function hardware accelerator to perform the first function on the first data to generate second data; and
      receive the second data from the first virtual function hardware accelerator, wherein the second virtual function hardware accelerator is configurable to perform the second function on the second data to generate third data without outputting the second data to the host processor.

2. The integrated circuit of claim 1, wherein the second function performed by the second virtual function hardware accelerator is different from the first function performed by the first virtual function hardware accelerator.

3. The integrated circuit of claim 1, comprising a direct memory access engine configured to send the first data to an off-chip memory device.

4. The integrated circuit of claim 1, wherein the third data that is output from the second virtual function hardware accelerator is fed back to a selected virtual machine in a plurality of virtual machines configured to run on an external host processor that is coupled to the integrated circuit.

5. The integrated circuit of claim 4, wherein the first virtual function hardware accelerator and the second virtual function hardware accelerator respectively comprise programmable logic elements reconfigurable to perform different custom functions.

6. The integrated circuit of claim 4, wherein the data switching circuitry is configured to perform function chaining between a subset of a plurality of virtual function hardware accelerators that includes the first virtual function hardware accelerator and the second virtual function hardware accelerator according to a set of predetermined chaining instructions without sending intermediate data back to the external host processor.

7. A method of operating a network functions virtualization (NFV) system having a host processor and a coprocessor implemented as an integrated circuit, comprising:
   receiving first data from the host processor at the coprocessor;
   using a first virtual function accelerator in the coprocessor to perform a first function on the first data to produce second data; and
   using a second virtual function accelerator in the coprocessor to perform a second function on the second data to produce third data without outputting the second data to the host processor.

8. The method of claim 7, comprising using data switching circuitry to route data among a plurality of virtual function accelerators that includes the first virtual function accelerator and the second virtual function accelerator, wherein the data switching circuitry is configured to support virtual function accelerator chaining between the first virtual function accelerator and the second virtual function accelerator according to a predetermined set of chaining instructions.

9. The method of claim 7, comprising using a third virtual function accelerator in the coprocessor to perform a third function on the third data to produce fourth data without outputting the third data to the host processor.

10. The method of claim 9, comprising outputting only the fourth data to the host processor at the coprocessor.

11. The method of claim 7, comprising determining that a first virtual function accelerator condition is satisfied before performing the first function.

12. The method of claim 11, comprising skipping the first function when the first virtual function accelerator condition has not been satisfied.

13. The method of claim 7, comprising analyzing sideband signals associated with the second data to determine whether the second function should be performed on the second data.

14. A system, comprising:
a programmable logic device comprising a first virtual function accelerator and a second virtual function accelerator, wherein the programmable logic device is configured to generate a chained result at least in part by instructing the first virtual function accelerator to perform a first operation on data output from the second virtual function accelerator; and
a central processing system coupled to the programmable logic device, wherein the central processing system is configured to store the chained result from the programmable logic device in a memory accessible via the central processing system.

15. The system of claim 14, wherein the programmable logic device comprises a plurality of virtual function accelerators that includes the first virtual function accelerator and the second virtual function accelerator, wherein the first operation performed by the first virtual function accelerator is a different operation than that performed by each of the plurality of virtual function accelerators.

16. The system of claim 14, wherein the programmable logic device comprises a plurality of virtual function accelerators that includes the first virtual function accelerator and the second virtual function accelerator, wherein each virtual function accelerator of the plurality of virtual function accelerators is configured to perform a respective operation on a respective portion of data in response to a respective condition being met for that virtual function accelerator.

17. The system of claim 14, wherein the first operation is performed in response to an accelerator condition of the first virtual function accelerator being met.

18. The system of claim 17, wherein the programmable logic device is configured to:
bypass the first virtual function accelerator when the accelerator condition has not been satisfied; and
transmit the data output from the second virtual function accelerator to a third virtual function accelerator.

19. The system of claim 14, wherein the programmable logic device is configured to:
determine that input data is characterized as a first data type; and
in response to determining that the input data is characterized as the first data type, perform chained operations on the input data, wherein the chained operations comprise instructing the second virtual function accelerator to perform a second operation on the input data to generate the data output from the second virtual function accelerator.

20. The integrated circuit of claim 1, wherein the data switching circuitry is configured to determine to route the second data to the second virtual function hardware accelerator based on a value of the second data.

* * * * *